Figure 1:
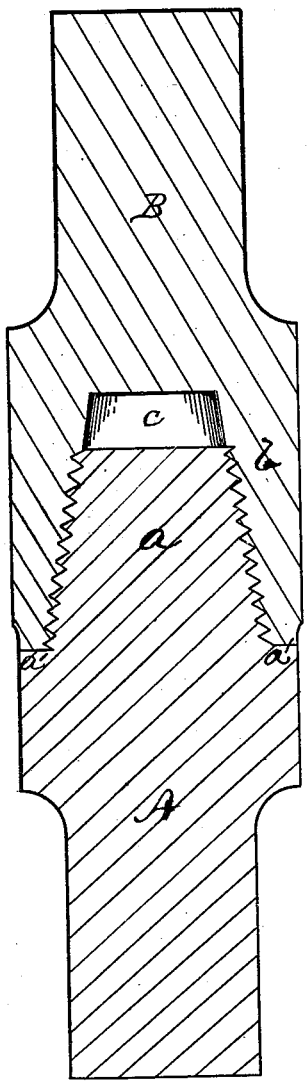

J. L. ALEXANDER.
Joint for Oil-Well Tools.

No. 201,082. Patented March 12, 1878.

Witnesses.
John K Smith
John F. Best

Inventor.
John Lyon Alexander
By Bakewell & Kerr
attys.

UNITED STATES PATENT OFFICE.

JOHN L. ALEXANDER, OF EDENBURG, PENNSYLVANIA.

IMPROVEMENT IN JOINTS FOR OIL-WELL TOOLS.

Specification forming part of Letters Patent No. 201,082, dated March 12, 1878; application filed January 29, 1878.

*To all whom it may concern:*

Be it known that I, JOHN LYON ALEXANDER, of Edenburg, in the county of Clarion and State of Pennsylvania, have invented a new and useful Improvement in Joints for Oil-Well Tools, &c.; and I do hereby declare the following to be a full, clear, and exact description thereof, reference being given to the accompanying drawing, forming part of this specification, and which is a longitudinal central section of a joint embodying my invention.

My invention relates to the construction of joints for oil-well tools; and consists in tapering the pin and interior of the box, and also tapering the threaded pin, so that their strength is greatly augmented at and near the shoulders, where they are subjected to the greatest strain, and are most liable to break.

Heretofore, in the construction of joints for oil-well tools, sucker-rods, &c., it has been common to form an internally-threaded socket or box of even bore (or interior diameter) throughout, and whose thickness was about one-fourth the diameter of the joint, so that the whole amount of metal was about equally divided between the box and pin.

When in use, the greatest strain occurs either at the top or shoulder of the box, or at the shoulder of the pin, and the joint frequently breaks either at one point or the other, causing much trouble and delay.

It is at once apparent that the strength of the ordinary joint is only equal to the strength of the pin or of a rod one-half the diameter of said joint, and thus in such connections the points where the greatest strains occur are in reality the least able to resist them. It is not possible to overcome this difficulty by increasing the thickness of the box and pin, for such a procedure would increase the diameter of the joint beyond what it is practicable to use in an oil or similar well.

In order that others skilled in the art to which it appertains may apply my invention, I will proceed to describe the construction of joint whereby I overcome the existing difficulties and objections.

A and B indicate the two sections of a joint with threaded pin $a$ and socket or box $b$. The pin $a$, at its base, is slightly less in diameter than the whole diameter of the joint, and tapers thence to its extremity, which may be half the diameter of the joint, or less, if desired, or, in other words, is a frustum of a cone whose base is slightly less than a cross-section of the joint.

The difference between the diameter of the pin at its base and the whole diameter of the joint is due to a slight shoulder, $a'$, against which the socket $b$ abuts.

$b$ is the socket or box section, having the tapered cavity $c$, corresponding to the form of pin $a$, so that the thickness of the box or socket increases steadily from its extremity toward the shoulder, and at the shoulder it is almost solid, whereby great strength is gained.

The pin $a$ and box $b$ are threaded, as before specified.

In connecting the parts much time is saved and less labor required, as the pin passes about half-way into the box or socket before the threads engage, and the parts being centered, there is no difficulty or delay in causing the threads to engage properly.

The diameters of the pin and box at the shoulders being equal, or about equal, to the whole diameter of the joint, great strength is obtained; and if, from leverage or other cause, the upper part of pin $a$ should be broken in the socket or box, the parts would not separate unless the force were sufficient to break the box also, which is very unlikely to occur, as the box at that point would be very thick.

Additional advantages of my devices are, that they can be screwed up or set much tighter than any other joint known to me, and this without danger of breaking. Longer and heavier wrenches may be used to tighten the parts, and the parts are more readily handled and connected.

I am aware that tapering sectional joints have heretofore been made, and do not claim the same, as such construction is directed simply to obtaining a secure union of the parts, and tends to weaken rather than strengthen the rods.

Having thus described the nature and advantages of my invention, what I claim, and desire to secure by Letters Patent, is—

In a joint for oil-well tools, sucker-rods, &c., the combination of the solid box or socket having a tapering threaded cavity and the tapering threaded pin, substantially as specified.

In testimony whereof I, the said JOHN LYON ALEXANDER, have hereunto set my hand.

JOHN LYON ALEXANDER.

Witnesses:
 WILLIAM HENRY HARLEY,
 FRANK HARE BOLU.